United States Patent [19]
Ngoc et al.

[11] Patent Number: 5,962,591
[45] Date of Patent: *Oct. 5, 1999

[54] POLYMER BLEND

[75] Inventors: Hung Dang Ngoc, Limeil Brevannes; Bernard Louis Marie Nigen, Meudon, both of France

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,076

[22] Filed: Aug. 26, 1997

[51] Int. Cl.$^6$ .............................. C08L 33/04; B32B 27/30
[52] U.S. Cl. ......................... 525/229; 525/85; 525/207; 525/208; 525/222; 525/223; 525/224; 525/228; 525/238; 525/902; 428/523; 523/201
[58] Field of Search ................................ 525/229, 224, 525/222, 223, 228, 238, 207, 208, 902, 85; 523/201; 428/523

[56] References Cited

U.S. PATENT DOCUMENTS 5,504,155   4/1996   Ngoc et al. ................................ 525/70

Primary Examiner—Mark L. Warzel
Attorney, Agent, or Firm—Alvin T Rockhill

[57] ABSTRACT

There is a need for halogen-free polymeric compositions which offer increased heat and ultraviolet light resistance for utilization in automotive interiors. For instance, it is particularly critical for polymers which are utilized in making skin compounds for automotive instrument and door panels to display excellent heat and ultraviolet light resistance. This invention discloses a leathery composition which is useful in automotive applications which is comprised of (1) a compatibilizing polymer selected from the group consisting of ethylene vinyl acetate and ethylene alkyl acrylates, (2) a polyolefin and (3) a rubbery polymer which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

20 Claims, No Drawings

POLYMER BLEND

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with ABS (acrylonitrile/butadiene/styrene polymers) which are sometimes modified with nitrile rubber (NBR). The nitrile rubber is included in such blends as a permanent modifier for the PVC which provides it with a higher degree of flexibility.

The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/ABS/NBR blends which are utilized as skins for automotive interior panels. However, the degree to which the aging characteristics of such blends can be improved by the addition of additives is limited. In fact, there is a demand for performance characteristics in such applications which heretofore has not been realized by the utilization of heat and light stabilizers. For instance, it would be highly desirable for the skins used in automotive panels to resist discoloration and cracking under conditions of high heat and intense ultraviolet light throughout the life of the vehicle.

NBR/ABS/PVC blends offer an array of physical properties which make them useful as a skin composition for automotive panels. The NBR acts as a permanent flexibilizing monomer for the PVC. It also acts as a shrinkage control agent, and embossing aid, and improves grain retention. The NBR in such blends further provides vacuum forming gauge control and exhibits low fog characteristics. NBR is highly compatible with PVC and has the capability of being recycled.

U.S. Pat. No. 5,380,785, U.S. Pat. No. 5,415,940, U.S. Pat. No. 5,504,155, U.S. Pat. No. 5,504,160 and U.S. Pat. No. 5,616,651 disclose a rubbery polymer which can be blended with PVC to make leathery compositions. These compositions are particularly useful in manufacturing skins for automotive interior panelling. Skin compositions which are made utilizing this rubbery polymer provide a higher level of resistance to heat and ultraviolet light than those made utilizing conventional NBR/ABS/PVC blends. The rubbery polymers disclosed by these patents also offer low fog characteristics, low odor, shrinkage control and grain retention. They also act as an embossing aid and as a permanent flexibilizing modifier. However, one drawback to these rubbery polymer/polyvinyl chloride blends is that they contain a halogen.

There is currently a demand for skin compositions having excellent heat and ultra-violet light resistance that do not contain halogens, such as polyvinyl chloride. This is because industry in general and the automotive industry in particular are attempting to reduce the amount of halogenated materials in industrial products for improved recyclability and other environmental reasons.

SUMMARY OF THE INVENTION

This invention is based upon the discovery that blends of certain rubbery polymers with polyolefins can be compatabilized with ethylene alkyl acrylates or ethylene vinyl acetate. These blends can be made so as to be useful as skins for automotive interior panels and can be made so as to be leathery in nature.

This invention more specifically discloses a leathery composition which is useful in automotive applications which is comprised of (1) a compatibilizing polymer selected from the group consisting of ethylene vinyl acetate and ethylene alkyl acrylates, (2) a polyolefin and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

The subject invention also reveals a panel for automotive applications which is comprised of a semirigid foam, such as a urethane foam or a polyolefinic polymer foam, which is supported by a rigid backing, wherein said semirigid foam is covered with a leathery skin which is comprised of (1) a compatibilizing polymer selected from the group consisting of ethylene vinyl acetate and ethylene alkyl acrylates, (2) a polyolefin and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

DETAILED DESCRIPTION OF THE INVENTION

The rubbery polymers that can be utilized in making the blends of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units which are derived from those monomers.

The rubbery polymers of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

The rubbery polymer will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene and (e) from about 1 weight percent to about 3 weight percent of a crosslinking agent. The percentages reported in this paragraph are based upon the total weight of the rubbery polymer.

The rubbery polymers utilized in the blends of this invention are synthesized in an aqueous reaction mixture by utilizing a free radical polymerization technique. The reaction mixture utilized in this polymerization technique is comprised of water, the appropriate monomers, a suitable free radical initiator, a crosslinking agent and a soap. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.05 phm (parts per hundred parts of monomer by weight) to about 3 phm of at least one member selected from the group consisting of metal salts of alkyl sulfates and metal salts of alkyl sulfonates. It is generally preferred for the reaction mixture to contain from about 0.1 phm to about 2.5 phm of the metal salt of the alkyl sulfonate or the metal salt of the alkyl sulfate. It is normally more preferred for the reaction mixture to contain from about 0.5 phm to about 2 phm of the metal salt of the alkyl sulfonate or the metal salt of the alkyl sulfate.

The sulfonate surfactants that are useful in synthesizing the rubbery polymers used in the blends of this invention are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl® D1-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

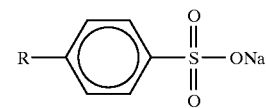

wherein R represents an alkyl group containing from 1 to about 20 carbon atoms. It is preferred for the alkyl group to contain from about 8 to about 14 carbon atoms.

Other soaps, such as half ester maleate soaps, can also be used. The half ester maleate soap utilized in the polymerization is prepared by reacting maleic anhydride with a fatty alcohol containing from about 10 to about 24 carbon atoms. It is typically preferred to utilize a fatty alcohol which contains from about 12 to about 16 carbon atoms. One mole of the maleic anhydride is reacted with one mole of the fatty alcohol in producing the half ester maleate soap. This reaction is typically conducted at a temperature which is within the range of about 50° C. to about 80° C. and can be depicted as follows:

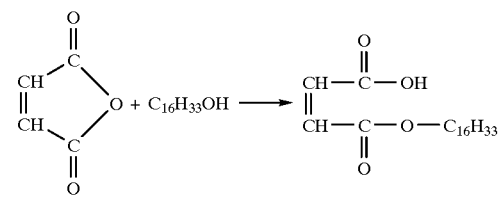

Sodium hydroxide or potassium hydroxide is then typically added to make the half ester maleate soap. This step can be depicted as follows:

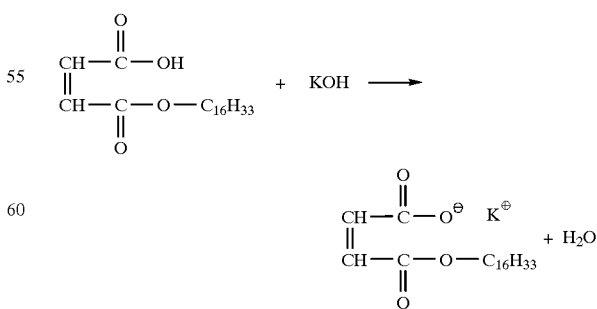

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water-soluble peroxygen-free radical initiators are especially useful in such aqueous polymerizations.

The emulsion polymerizations of this invention are typically carried out at the temperature ranging between about 60° F. (20° C.) and 190° F. (88° C.). At temperatures above about 88° C., alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55° C., a redox initiator system is required to insure satisfactory polymerization rates.

The free radical emulsion polymerization utilized in synthesizing the rubbery polymers employed in the blends of this invention are typically conducted at a temperature which is within the range of about 10° C. to about 95° C. In most cases, the polymerization temperature utilized will vary between about 20° C. and about 80° C. The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile and from about 1 to about 3 weight percent crosslinking agent.

After the seed polymer latex has been prepared, styrene monomer, additional acrylonitrile monomer and additional crosslinking agent is added to the seed polymer containing latex. As a general rule, from about 4 parts by weight to about 30 parts by weight of styrene, from about 1 part by weight to about 20 parts by weight of additional acrylonitrile and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates and divinylbenzene. Proven to be particularly useful as the crosslinking agent is 1,4-butanediol dimethacrylate.

In most cases, the polymerization will be continued until a high monomer conversion has been attained. After the polymerization has been completed, it is normally desirable to add an aminoalcohol to the emulsion to deodorize the latex. The aminoalcohol will generally be of the structural formula HO—A—$NH_2$ wherein A represents an alkylene group which contains from 2 to about 20 carbon atoms. It is normally preferred for the aminoalcohol to contain from 2 to about 10 carbon atoms with amino alcohols which contain from 2 to about 5 carbon atoms being most preferred. Ethanolamine (HO—$CH_2$—$CH_2$—$NH_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butyl acrylate and acrylonitrile which is present in the emulsion. This reaction will proceed over a broad temperature range and the deodorizing step can be conducted at any temperature which is within the range of about 5° C. and about 95° C. However, for practical reasons, the deodorizing step will normally be carried out at a temperature which is within the range of about 20° C. to about 70° C. Since the reaction is faster at higher temperatures, the amount of reaction time needed will decrease with increasing temperature. For instance, at a temperature of about 20° C., a residence time in the deodorizing step of one to three days may be required. On the other hand, at a temperature of about 65° C., only about two hours of reaction time is normally required.

The amount of time required for the aminoalcohol to react with the residual n-butyl acrylate monomer and residual acrylonitrile monomer will also depend upon the level of aminoalcohol utilized. As a general rule, from about 0.05 weight percent to about 2 weight percent of the aminoalcohol will be added, based upon the total weight of the emulsion. More typically, from about 0.1 weight percent to about 1.5 weight percent of the aminoalcohol will be added. It is normally preferred to utilize from about 0.3 weight percent to about 1 weight percent of the aminoalcohol.

The rubbery polymer made by the two-step batch polymerization process is recovered from the emulsion (latex) after the optional deodorizing step. This can be accomplished by utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath which will further reduce odor. After being washed, the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent which can be utilized in such applications.

U.S. Pat. No. 5,616,651 describes a process for synthesizing rubbery polymers that can be employed in the blends of this invention in detail. The teachings of U.S. Pat. No. 5,616,651 are accordingly incorporated herein by reference in their entirety. Rubbery polymers that can be used in the practice of this invention are also sold by The Goodyear Tire & Rubber Company as Sunigum® rubber.

Some representative examples of ethylene alkylacrylate polymers that can be used in the blends of this invention include ethylene/methyl acrylate copolymers, ethylene/ethyl acrylate copolymers, ethylene/propyl acrylate copolymers, ethylene/butyl acrylate copolymers, ethylene/butyl acrylate/ carbon monoxide terpolymers, ethylene/ethyl acrylate/ maleic anhydride terpolymers and ethylene/acrylate/ glycidyl methacrylate terpolymers.

A wide variety of polyolefins can be utilized in the blends of this invention. Some representative examples of polyolefins that can be used include polyethylene, polypropylene, polyethylene/polypropylene copolymers and other thermoplastic polyolefins.

The rubbery polymers described herein can be blended with a compatibilizing polymer and a polyolefin polymer to make leather-like compositions. These leathery compositions offer an excellent combination of properties for utilization in making skin compounds for panels used in automotive applications. These leathery compositions can be prepared by blending the rubbery polymer with the polyolefin polymer and the comparabilizing polymer utilizing standard mixing techniques. It is highly preferred for the rubbery polymer to be in powdered form when blended with the polyolefin and the compatibilizing polymer to make such leathery compositions.

The blends of this invention will typically contain from about 10 parts to about 1000 parts of the polyolefin polymer and from about 1 to about 200 parts by weight of the compatibilizing polymer per 100 parts by weight of the rubbery polymer. It is typically preferred for the leathery compositions of this invention to contain from about about 50 parts to about 400 parts of the polyolefin polymer and from about 5 to about 100 parts by weight of the compatibilizing polymer per 100 parts by weight of the rubbery polymer. It is typically most preferred for the leathery compositions of this invention to contain from about about 100 parts to about 300 parts of the polyolefin polymer and from about 10 to about 50 parts by weight of the compatibilizing polymer per 100 parts by weight of the rubbery polymer.

Various colorants and/or pigments will typically also be added to the composition to attain the desired color. A wide variety of plasticizers which are compatible with the polyolefin resin and/or the rubbery polymer can also optionally be employed.

The leathery compositions of this invention are useful in a wide variety of applications. For example, they have been found to be extremely valuable when used in making skins for automotive panels. Such panels are typically comprised of a semi-rigid foam which is supported by a rigid backing and covered with the leathery composition of this invention. Such skins are made by calendering or extruding the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

This invention is illustrated by the following examples which are merely for the purpose of illustration and are not to be regarded as limiting the scope of the invention or the manner in which it can be practiced. Unless specifically indicated otherwise, all parts and percentages are given by weight.

Example 1 and Comparative Example 2

In this experiment, a compatabilized blend of Sunigum® 7395 rubber and a polyethylene/polypropylene copolymer was prepared by blending 50 parts of Sunigum® 7395, 0.225 parts of Irganox 1010 antioxidant, 50 parts of the polyethylene/polypropylene copolymer and 5 parts of Lotader® AX8900 random ethylene/acrylic ester/glycidyl methacrylate terpolymer (compatibilizing polymer). For comparative purposes, a second blend was made without including the compatibilizing polymer. Some of the physical properties of the two blends were determined and are reported in Table I.

TABLE I

|  | Example 1 | Comparative Example 2 |
| --- | --- | --- |
| Shore D Hardness | 45 | 42 |
| Tensile Strength | 9.9 MPa | 9.2 MPa |
| Modulus @ 50% | 9.3 MPa | 9.0 MPa |
| Elongation @ Break | 625% | 125% |
| Elongation @ Maximum Load | 470% | 25% |
| Tear Strength | 98 KN/m | 87 KN/m |

As can be seen from Table I, the compatabilized blend of this invention had much higher elongation at break and elongation at maximum load than did the control that did not contain the compatibilizing polymer. Much better compatibility was also apparent from visual inspection and touch.

EXAMPLES 3–6

In this series of experiments, Sunigum® 7395 rubber was blended into polyethylene/polypropylene copolymer to improve the paint adhesion characteristics thereof. Ethylene vinyl acetate was used as the compatibilizing polymer in this series of experiments. The amounts of polyethylene/polypropylene copolymer, Sunigum® 7395 rubber and ethylene vinyl acetate employed in making these blends is shown in Table II. The surface tension and paint adhesion characteristics of the blends made was determined and is also reported in Table II. It should be noted that Example 3 was carried out as a control and did not contain any Sunigum® rubber or ethylene vinyl acetate.

TABLE II

|  | Example | | | |
| --- | --- | --- | --- | --- |
|  | 3 | 4 | 5 | 6 |
| PE/PP | 100% | 40% | 20% | 0% |
| EVA | 0% | 30% | 40% | 50% |
| Rubber | 0% | 30% | 40% | 50% |
| Surface Tension[1] | <32 | <34 | <38 | 48 |
| Paint Adhesion | 0% | 5% | 50% | 100% |

[1]Surface Tension is reported in dyne/cm.

As can be seen from Table II, the Sunigum® 7395 rubber acted to greatly improve the paint adhesion characteristics of the polyethylene/polypropylene copolymer. It also acted to increase the surface tension of the polymer.

EXAMPLE 7 AND COMPARATIVE EXAMPLE 8

In this experiment, a compatabilized blend of Sunigum® 7395 rubber and a metallocene catalyzed polyethylene was prepared by blending 50 parts of Sunigum® 7395, about 0.25 parts of Irganox 1010 antioxidant, 50 parts of the polyethylene and 5 parts of Lotader® AX8900 random ethylene/acrylic ester/glycidol methacrylate terpolymer (compatibilizing polymer). For comparative purposes, a second blend was made without including the compatibilizing polymer. Some of the physical properties of the two blends were determined and are reported in Table III.

TABLE III

|  | Example 7 | Comparative Example 8 |
| --- | --- | --- |
| Shore A Hardness | 61 | 60 |
| Tensile Strength | 3.8 MPa | 1.8 MPa |
| Modulus @ 50% | 1.5 MPa | 1.4 MPa |
| Elongation @ Break | 755% | 225% |
| Tear Strength | 24 KN/m | 19 KN/m |

As can be seen from Table III, the compatibilized blend of this invention had much higher elongation at break than did the control that did not contain the compatibilizing polymer. Much better compatibility was also apparent from visual inspection and touch.

While certain representative embodiments and details have been shown for the purpose of illustrating the subject invention, it will be apparent to those skilled in this art that various changes and modifications can be made therein without departing from the scope of the subject invention.

What is claimed is:

1. A leathery composition which is useful in automotive applications which is comprised of (1) an ethylene alkyl acrylate compatibilizing polymer, (2) a polyolefin and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

2. A composition as specified in claim 1 wherein said ethylene alkyl acrylate compatibilizing polymer is selected from the group consisting of ethylene/methyl acrylate copolymers, ethylene/ethyl acrylate copolymers, ethylene/propyl acrylate copolymers, ethylene/butyl acrylate copolymers, ethylene/butyl acrylate/carbon monoxide terpolymers, ethylene/ethyl acrylate/maleic anhydride terpolymers and ethylene/acrylate/glycidyl methacrylate terpolymers.

3. A composition as specified in claim 1 wherein said polyolefin is polyethylene.

4. A composition as specified in claim 1 wherein said polyolefin is polypropylene.

5. A composition as specified in claim 1 wherein said polyolefin is an ethylene/propylene copolymer.

6. A composition as specified in claim 1 wherein the crosslinking agent is selected from the group consisting of difunctional acrylates, trifunctional acrylates, difunctional methacrylates, trifunctional methacrylates and divinylbenzene.

7. A composition as specified in claim 1 wherein the crosslinking agent is 1,4-butanediol dimethacrylate.

8. A composition as specified in claim 1 wherein the crosslinking agent is divinylbenzene.

9. A composition as specified in claim 1 wherein the member selected from the group consisting of methyl methacrylate, ethyl methacrylate, methyl acrylate and ethyl acrylate is methyl acrylate.

10. A composition as specified in claim 1 wherein said composition contains from about 10 parts to about 1000 parts of the polyolefin polymer and from about 1 to about 200 parts by weight of the ethylene alkyl acrylate compatibilizing polymer per 100 parts by weight of the rubbery polymer.

11. A composition as specified in claim 1 wherein said composition contains from about 50 parts to about 400 parts of the polyolefin polymer and from about 5 to about 100 parts by weight of the ethylene alkyl acrylate compatibilizing polymer per 100 parts by weight of the rubbery polymer.

12. A composition as specified in claim 1 wherein said composition contains from about 100 parts to about 300 parts of the polyolefin polymer and from about 10 to about 50 parts by weight of the ethylene alkyl acrylate compatibilizing polymer per 100 parts by weight of the rubbery polymer.

13. A composition as specified in claim 1 wherein said rubbery polymer is comprised of (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

14. A composition as specified in claim 1 wherein said rubbery polymer is comprised of (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

15. A composition as specified in claim 1 wherein said rubbery polymer is comprised of (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene and (e) from about 1 weight percent to about 3 weight percent of a crosslinking agent.

16. A composition as specified in claim 3 wherein said polyethylene was prepared with a metallocene catalyst.

17. A panel for automotive applications which is comprised of a semirigid foam which is supported by a rigid backing, wherein said semirigid foam is covered with a leathery skin which is comprised of (1) an ethylene alkyl acrylate compatibilizing polymer, (2) a polyolefin and (3) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

18. A panel for automotive applications as specified in claim 17 wherein said ethylene alkyl acrylate compatibilizing polymer is selected from the group consisting of ethylene/methyl acrylate copolymers, ethylene/ethyl acrylate copolymers, ethylene/propyl acrylate copolymers, ethylene/butyl acrylate copolymers, ethylene/butyl acrylate/carbon monoxide terpolymers, ethylene/ethyl acrylate/maleic anhydride terpolymers and ethylene/acrylate/glycidyl methacrylate terpolymers.

19. A panel for automotive applications as specified in claim 18 wherein said leathery skin contains from about 50 parts to about 400 parts of the polyolefin polymer and from about 5 to about 100 parts by weight of the ethylene alkyl acrylate compatibilizing polymer per 100 parts by weight of the rubbery polymer.

20. A panel for automotive applications as specified in claim 19 wherein said rubbery polymer is comprised of (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

* * * * *